United States Patent
Delaveau et al.

(10) Patent No.: US 7,277,052 B2
(45) Date of Patent: Oct. 2, 2007

(54) METHOD FOR THE MULTISTATIC DETECTION AND LOCATING OF A MOBILE CRAFT THROUGH THE USE OF DIGITAL BROADCASTING TRANSMITTERS

(75) Inventors: François Delaveau, Le Perreux sur Marne (FR); Dominique Heurguier, Le Perreux sur Marne (FR); Philippe Buscailhon, Paris (FR); François Pipon, Paris (FR); Emmanuel Gross, Paris (FR); Dieudonné Josset, Bois-Colombes (FR)

(73) Assignee: Thales, Neuilly sur Seine (FR)

( * ) Notice: Subject to any disclaimer, the term of this patent is extended or adjusted under 35 U.S.C. 154(b) by 391 days.

(21) Appl. No.: 10/895,993

(22) Filed: Jul. 22, 2004

(65) Prior Publication Data
US 2005/0285787 A1    Dec. 29, 2005

(30) Foreign Application Priority Data
Jul. 25, 2003   (FR)   ................... 03 09167

(51) Int. Cl.
*G01S 1/24* (2006.01)
*G01S 3/02* (2006.01)
(52) U.S. Cl. .................. 342/387; 342/464
(58) Field of Classification Search ............... 342/453, 342/457, 387, 463, 464

See application file for complete search history.

(56) References Cited

U.S. PATENT DOCUMENTS

| | | | |
|---|---|---|---|
| 6,861,982 B2 * | 3/2005 | Forstrom et al. | 342/387 |
| 2004/0032363 A1 * | 2/2004 | Schantz et al. | 342/127 |

FOREIGN PATENT DOCUMENTS

| | | |
|---|---|---|
| FR | 0 669729 | 8/1995 |
| WO | WO 02/097467 | 12/2002 |
| WO | WO 03/014764 | 2/2003 |

* cited by examiner

*Primary Examiner*—Dao L. Phan
(74) *Attorney, Agent, or Firm*—Lowe Hauptman & Berner, LLP

(57) ABSTRACT

A method to detect and/or locate a mobile craft in a reception system making use of transmitters of opportunity, whose signal comprises elements enabling the synchronization of the receiver, wherein certain discriminating sequences are detected of the payload signal. Each transmission present on the carrier frequencies examined by the receiver or receivers is separated by the space/time filtering of the signals in each carrier frequency. The transmitters Ei corresponding to the signals received are identified. The pulse response of the propagation channel for each transmitter Ei and for each detection made on this transmitter are determined by measuring the instant of arrival of the path reflected by the mobile craft is measured and then its delay relative to the instant of transmission from the transmitter. The position of the mobile craft is deduced at the intersection of the ellipsoids defined by the foci constituted by the transmitters Ei from which signals are received and the receiver or receivers Rj. The disclosed method can be applied to the detection of an aircraft.

4 Claims, 6 Drawing Sheets

Detection, synchronization and spatial separation of source Processing structure

Single-track channel estimation + computation of power Processing structure

| Mode | 8k mode | | | | 2k mode | | | |
|---|---|---|---|---|---|---|---|---|
| Guard interval | 1/4 | 1/8 | 1/16 | 1/32 | 1/4 | 1/8 | 1/16 | 1/32 |
| Guard interval duration | 224μs | 112μs | 56μs | 28μs | 56μs | 28μs | 14μs | 7μs |
| Symbol duration | 1120μs | 1008μs | 952μs | 924μs | 280μs | 252μs | 238μs | 231μs |

Index scattered pilot = k   $k = K_{min} + 3 \times (l \bmod 4) + 12p$   $K_{min} = 0$
Index symbol = l   $k \in [K_{min}, K_{max}]$   $K_{max} = 1704$ in mode 2k
       $K_{max} = 6816$ in mode 8k

METHOD FOR THE MULTISTATIC DETECTION AND LOCATING OF A MOBILE CRAFT THROUGH THE USE OF DIGITAL BROADCASTING TRANSMITTERS

The present application is based on, and claims priority from, French Application Number 03 09167, filed Jul. 25, 2003, the disclosure of which is hereby incorporated by reference herein in its entirety.

BACKGROUND OF THE INVENTION

1. Field of the Invention

The present invention relates to a method for detecting and locating mobile craft (aircraft for example as well as surface vessels, underwater vessels, vehicles, etc.), in using especially the radiation produced by transmitters present in the vicinity for other applications (here below called transmitters of opportunity).

It can be applied to any communications transmitter or any transmission system using waveforms with a known synchronization protocol on one or more carrier frequencies exploited by the transmitter.

It can be used especially with systems comprising digital transmitters dedicated to video broadcasting (such as DVB-T or Digital Video Broadcasting-Terrestrial) or audio broadcasting (DAB or Digital Audio Broadcasting) or again cell network infrastructure transmitters (for PMR or Private Mobile Radio).

2. Description of the Prior Art

The majority of the presently existing or planned solutions for locating aircraft are based on general principles of radars, radar interceptors or IFF (Identification Friend or Foe) systems in electromagnetics and principles of sonars and sonar interceptors in acoustics.

Generation Controlled by a Transmitter Planned for this Purpose

The radar or sonar type solution uses a wave which is intended to be reflected from obstacles (aircraft, etc.). This solution exploits the paths taken by signals reflected by a receiver working together with the transmitter:
either collocated with the transmitter, in the case of active sonar or monostatic sonar,
or delocated from the transmitter in the form of:
active sonar or bistatic radar using one transmitter and one receiver
multistatic radar comprising several transmitters and one or more receivers.

These solutions nevertheless have the drawback of using specific transmitters that collaborate closely with the reception system of the signal induced by the presence of the aircraft. Such transmitters are indiscreet and often costly, and require much space. Furthermore, they are generally dedicated to certain special applications. They are small in number. They often require large amounts of space and their availability is sometimes limited.

Exploitation of the Proper Radiation Produced

Other solutions use the proper radiation produced:
by transmitter specific to the mobile craft. This is the well-known principle used in IFF and air traffic control systems to identify and track aircraft. This principle is also used in radar interceptors or sonar interceptors.
by the mobile craft itself (using for example passive sonar, detection of magnetic or electromagnetic anomalies). This radiation may come directly from the mobile craft, or may result from a phenomenon of the masking of a radiation source (shadow), or more generally it may come from a temporary and local modification of the ambient electromagnetic or acoustic/seismic field: the principle of anomaly detection applied for example for the activation of mine seekers for certain surveillance sensors, etc.

These approaches have the following drawbacks:
they are passive, without any collaboration with the transmitter;
they work only in the case of transmissions effectively detectable by a reception system, thus raising "rendezvous" problems, causing random phenomena, requiring a learning process, etc.

Furthermore, these approaches produce a rough measurement whose nature is chiefly angular. The distance is obtained only after passing through a tracking filter under certain conditions of implementation that are generally restricted.

Exploitation of the Proper Radiation Sent by Opportunity Transmitters and Reflected by the Targets Such methods are implemented to exploit the fortuitous presence of radar or other transmitters, for purposes of detection of targets present in the environment by receivers planned for this purpose. They rely on classic measurements of time difference of arrival, (TDOA) or direction of arrival (DOA) and sometimes on Doppler Subtraction Techniques.

These approaches presently have the following drawbacks:
the planned or existing systems are based essentially on the waveform properties and the Doppler properties of the waves sent (often multicarrier waves).
The planned or existing systems generally necessitate the simultaneous reception of signals of the direct path or the path of the signals reflected from the target to determine a difference between the instants of arrival.
Today, none of the systems possesses efficient capacities for separating the transmitters of opportunity that are present. For this reason:
the transmitters of opportunity envisaged in many existing systems are very small in number (in general, there is only one per processing band). This has the effect of limiting the locating precision produced or of considerably extending the time period needed for the production of high-quality locating.
The existing reception systems capable today of processing transmitters of opportunity are hard to integrate into relatively dense transmitter networks sharing the same frequency resource for such as networks designed for radio broadcasting (DVB-T, DAB) or cell network transmission (GSM or Global System Mobile, UMTS or Universal Mobile Telecommunication System), while the density of transmitters is a notable factor in performance (entailing numerous measurements and geometrical configurations).
The current systems do not enable the efficient processing of situations of complex multiple-transmission and are even less suited to the processing of situations of interference between the received signals.

The idea of the invention lies notably in the exploitation of the presence of transmitters of certain radio and television broadcasting networks such as the DVB-T, DAB broadcasting systems or the infrastructure transmitters of cell networks, PMR or the like. It uses especially opportunities for the time-related synchronization of signals, as well as efficient source-separation methods.

The invention uses especially the protocol and the synchronization sequences known in certain digital audio or digital video broadcasting systems or again in cell networks to separate the transmitters and the signals directly determine the instants and directions of arrival of the signals of the different propagation paths and the pulse response of the propagation filter.

SUMMARY OF THE INVENTION

The invention relates to a method for the detection and/or locating of a mobile craft in a reception system making use of transmitters of opportunity whose signal comprises elements enabling the synchronization of the receiver. The method is characterized by the fact that it comprises at least the following steps:

a) detecting certain "discriminating" sequences of the payload signal,
b) separating each transmission present on the carrier frequencies examined by the receiver or receivers by the space/time filtering of the signals in each carrier frequency,
c) identifying the transmitters Ei corresponding to the signals received,
d) determining the pulse response of the propagation channel for each transmitter Ei and for each detection made on this transmitter,
g) measuring the instant of arrival of the path of the signal reflected by the mobile craft and then its delay relative to the instant of transmission from the transmitter,
h) deducing the position of the mobile craft at the intersection of the ellipsoids defined by the foci constituted by the transmitters Ei from which signals are received and the receiver or receivers Rj.

The method comprises for example the following steps:
e) the separation, in the pulse response, of the contribution of the direct transmitter-receiver path from the contribution of the path reflected by the mobile craft;
f) the measurement of the instant of arrival of the direct path and then its delay relative to the instant of transmission from the transmitter;
g) the measurement of the instant of arrival of the path reflected by the mobile craft and then its delay relative to the direct signal from the transmitter.

The method may also comprise:
i) a step for the measurement of the angles of arrival of the signal reflected by the mobile craft at the receivers Rj,
j) step for deducing the position of the mobile craft at the intersection between the previously defined ellipsoids and the straight line defined by the angles of arrival and the position of the receiver Rj.

The method according to the invention has especially the following advantages:
substantial processing gains,
a capacity for separating the different transmitters sharing a same carrier or carrier frequency, thus making it possible both to avert inconvenience through from interference and apply the method simultaneously to several transmitters,
the possibility of using the transmitters present passively (i.e. without modifying the radio frequency environment) and discreetly for classic applications of digital radio or television broadcasting (DAB, DVB) and more generally any network of transmitters known (either by standardization or by prior analysis) possessing certain properties of time synchronization (the sending of synchronization words, learning sequences, pilot codes, etc.) intended for locking into the receivers such as cell infrastructure networks, PMR networks, satellite networks, etc.
Directly producing a complete location of a mobile craft by making use of permanent transmissions with foreseeable characteristics enabling multiple and reliable measurements,
building networks of wide-coverage sensors without any need for reception of the direct path from the transmitter to the receiver processing the path reflected by the mobile craft and coming from this same transmitter.

BRIEF DESCRIPTION OF THE DRAWINGS

Other features and advantages of the present invention shall appear more clearly from the following non-exhaustive description along with the appended figures, of which.

MORE DETAILED DESCRIPTION

In order to provide for a clearer understanding of the principle implemented by the invention, the following exemplary application is described by way of an illustration that is in no way exhaustive. The application relates to the locating of an aircraft in reception system based on an array of antennas and a multiple-track architecture for the reception and digitization of the signals. The signals are of a digital type and comprise a sequence for the synchronization of the receiver.

The reception system comprises, for example, several multiple-track sensors and one or more processors adapted to the execution of the space/time separation techniques. A processor is adapted especially to performing the following operations:

getting synchronized with the received signal and with different propagation paths coming from the transmitter, namely the direct signal if it is received and/or that of the signal reflected by the aircraft.

measuring a pulse response of the propagation channel, separating the different paths and measuring the instants of arrival of these paths, with a precision depending on the characteristics of the processed signal and the duration of integration of the synchronization processing system, measuring, if necessary, the angles of arrival on the different propagation paths by dedicated goniometry or direction-finding techniques directly prolonging the synchronization, separating the different transmitters that share a common RF resource, in order to:

carry out individualized measurements on each transmitter present in the analysis band, exploit the multiplicity of the transmitters for multistatic detection using a "large number of transmitters".

Figure 1:
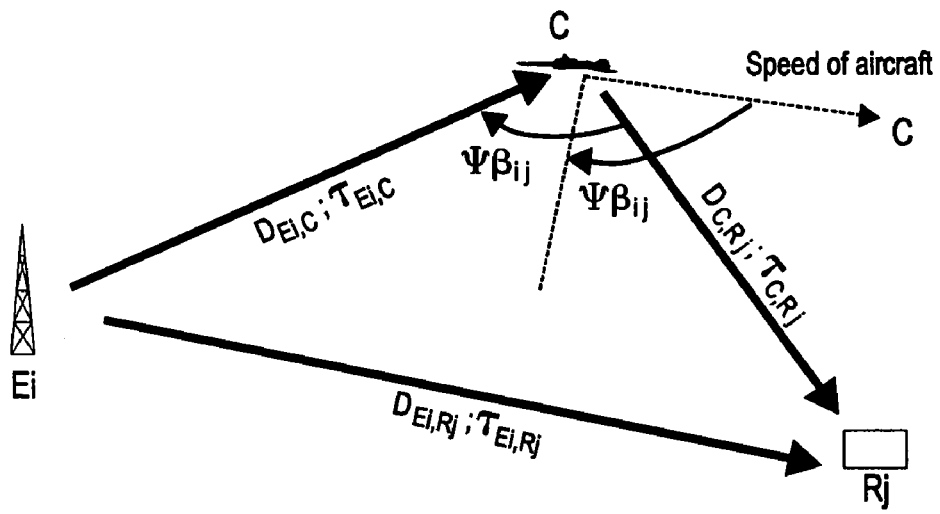
FIG. 1 exemplifies a geometrical configuration of a system comprising a transmitter, receiver and aircraft to be located.

FIG. 1 gives a schematic view of an example of the implementation of the method according to the invention for a device comprising at least one transmitter Ei, one receiver Rj and one aircraft C, for digital signals comprising discriminating sequences enabling synchronization.

($\Psi\beta i,j$ is the bistatic angle=$\Psi IeiC-\Psi Irj,C$; $\Psi Bi,j$=the bissectrix ($\Psi IeiC+\Psi Irj,C$)/2; $\tau_{Ei,C}$ is the duration of the path between the transmitter Ei and the target; $D_{Ei,C}$ is the distance of the path between the transmitter and the target; $\tau_{C,Rj}$ is the duration of the path between the target and the receiver Rj, $D_{C,Rj}$ is the distance of the path between the target and the receiver Rj; $\tau_{Ei,Rj}$ is duration of the path between the transmitter Ei and the receiver Rj, $D_{Ei,Rj}$ is the distance of the path between the transmitter Ei and the receiver Rj).

The method comprises, for example, the followings steps:

a) detecting certain sequences of the radio-broadcasting or television-broadcasting signals, carrying out measurements of synchronization on the signals coming from the received transmitters. The sequences used are the sequences enabling the synchronization of the receivers. The detection can be done by adapted filtering known to those skilled in the art.

b) separating each transmission present on the carrier frequencies examined by the receiver or receivers, for example by differential filtering of the different carriers, and then by space/time filtering of the signals present on each carrier;

c) identifying the corresponding transmitter Ei. The identification is done, for example, by decoding the identity of the transmitter when it is encoded in the signaling, by the measurement of the instant of arrival and of the recurrences between instants of arrival, by the determination of the color and synchronization characteristics or by any other method known to those skilled in the art;

d) determining the pulse response Hi of the propagation channel for each transmitter Ei and for each detection made on this transmitter (the transmission is detected by the receiver);

e) in this pulse response Hi, separating the contribution, if any, of the direct path of the signal between the transmitter and the receiver (Ei-Rj) from the contribution of the path of the signal reflected by the aircraft (Ei-C-Rj). This step uses, for example, the statistical and Doppler properties of the signal reflected by the aircraft which, given the ground/air/ground propagation and the motion of the aircraft, possesses the following properties:

the path Ei-C-Rj undergoes fewer fluctuations than the direct signal or the ground echoes, thus facilitating the methods of integration and extraction, the path Ei-C-Rj is affected by a Doppler shift that affects neither the direct path nor the ground echoes, thus enabling the implementation of Doppler subtraction techniques known to those skilled in the art.

f) measuring the instant of arrival $t_{Ei-Rj}$ of the directly received path (EiRj) if it is received, then its delay $\tau_{Ei,Rj}$ relative to the instant of transmission $t_{Ei}$ from the transmitter Ei if it is known or has been noted beforehand, g) measuring the instant of arrival $t_{Ei-C-Rj}$ of the path ($E_i$-C-$R_j$) reflected by the aircraft, then its delay $\tau_{Ei,C,Rj}$ relative to the direct signal from the transmitter Ei, if the latter is received, or else its delay $\tau_{Ei,C,Rj}-\tau_{Ei,Rj}$ relative to the instant of transmission $t_{Ei}$ of the signal by the transmitter when this instant is known or has been noted beforehand, h) deducing therefrom the position of the aircraft at the intersection of the ellipsoids defined by the foci constituted by the transmitters $E_i$ received and by the receiver or receivers Rj and by the following relationships:

$$\text{for } i \text{ and } j \; d(E_i,M)+d(R_j,M)-d(E_i,R_j) = c.(\tau_{Ei,C,Rj}-\tau_{Ei,Rj}) \quad (1)$$

with c as the velocity of light, $\tau_{Ei,C,Rj}-\tau_{Ei,Rj}$ the delay between the path $E_i$-C-$R_j$ and the path $E_i$-$R_j$ corresponding to the transmitter $E_i$ and to the receiver $R_j$.

i) measuring, if necessary, the angles of arrival of the signal reflected by the target (azimuth $\theta j$, elevation angle $\Delta j$) at the receivers Rj, j) deducing the position of the aircraft (mobile craft) C at the intersection between the above-defined ellipsoids and the straight line defined by the angles of arrival $\theta j$ and $\Delta j$ of the signal reflected from the target.

The reception of the direct path signal makes it possible especially to:

reinforce the method when the synchronization of the transmitters is already known; second determining of the parameter $\tau_{Ei,Rj}$; or eliminate the need to know the synchronization of the transmitters: the time difference $\tau_{Ei,C,Rj}-\tau_{Ei,Rj}$ is then measured directly after identification of the direct path and the reflected path.

The transmitters are, for example, digital radio-broadcasting and digital television-broadcasting transmitters or any other high-powered digital transmitter having discriminating sequences that are known in principle or can be extracted from the signal by preliminary analysis.

Other transmitters that can be used are, for example, digital RF transmitters whose characteristics are known by standardization or by preliminary analysis. They have certain properties of synchronization. Their coordinates (position) are, for example, known beforehand or else measured subsequently to the implementation of the method according to the invention.

Figure 2:
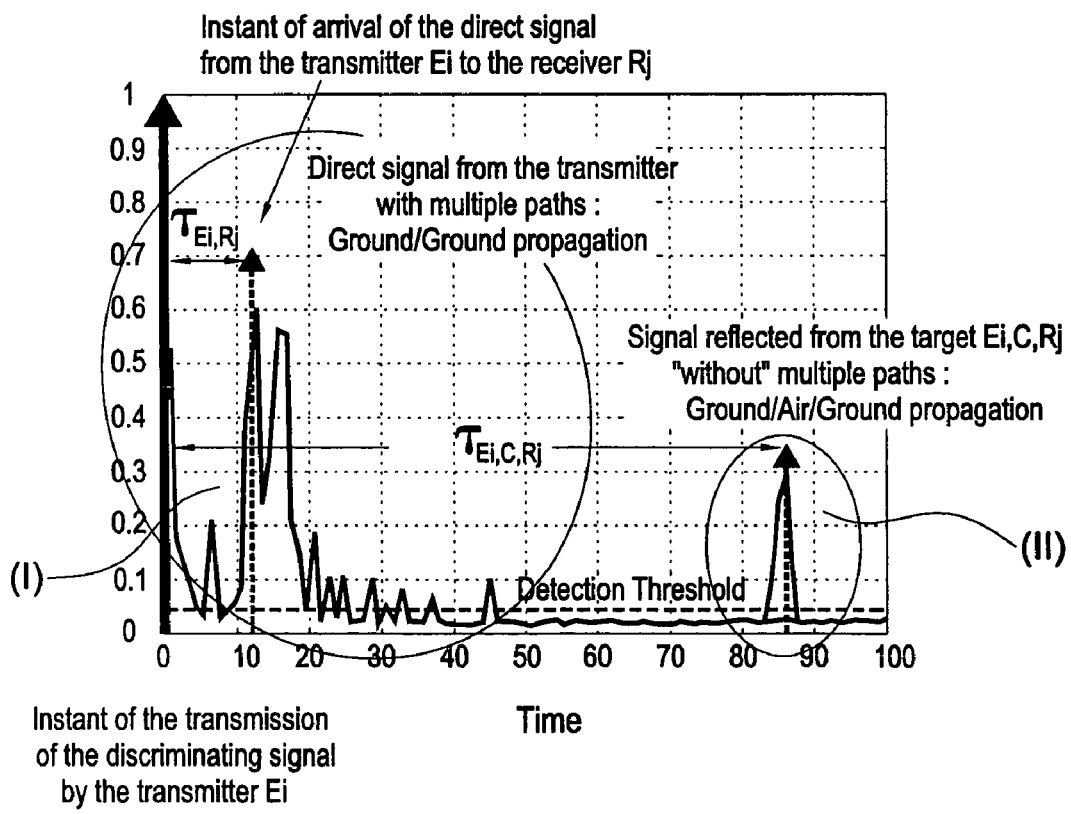
FIG. 2 illustrates the exploitation of the signals received on the receiver, FIG. 3 exemplifies a configuration exploiting only the signal reflected by the mobile aircraft, FIG. 4 exemplifies a detection principle using a sliding time window, FIG. 5 exemplifies a processing of synchronization and spatial separation of the sources, FIG. 6 provides an example of single-track channel estimation and power computation.

FIG. 2 provides an illustration, by way of a non-exhaustive example, of the extraction of the signal reflected from the aircraft in the event of reception of the direct path coming from the transmitter Ei with multiple paths related to the ground/ground propagation and reception of an echo coming from the aircraft on the same receiver. To carry out the synchronization step a), the receiver uses the signal corresponding to the direct path. The peaks of FIG. 2 are obtained at output of the criterion of synchronization and of the propagation channel estimation filter used in the source separation processing. To put it simply, the curve of FIG. 2 can be likened to the output of a (multiple-track) intercorrelation between the signal received at input and a replica of the discriminating signal expected in the received signal. The method used to obtain this curve is described in detail more specifically in the examples given here below by way of an illustration.

In a graph showing the temporal x-axis values, the first group (I) of peaks corresponds to the direct signal from the transmitter Ei with multiple ground/ground propagation paths. $\tau_{EiRj}$ corresponds to the periods of propagation of the direct signal from the transmitter Ei to the receiver Rj. The second group (II) of peaks corresponds to the signal reflected by the aircraft with a propagation period $\tau_{EiCRj}$.

The path Ei;C;Rj, for an aircraft is constituted by ground/air/ground propagation "without" multiple paths.

Figure 3:
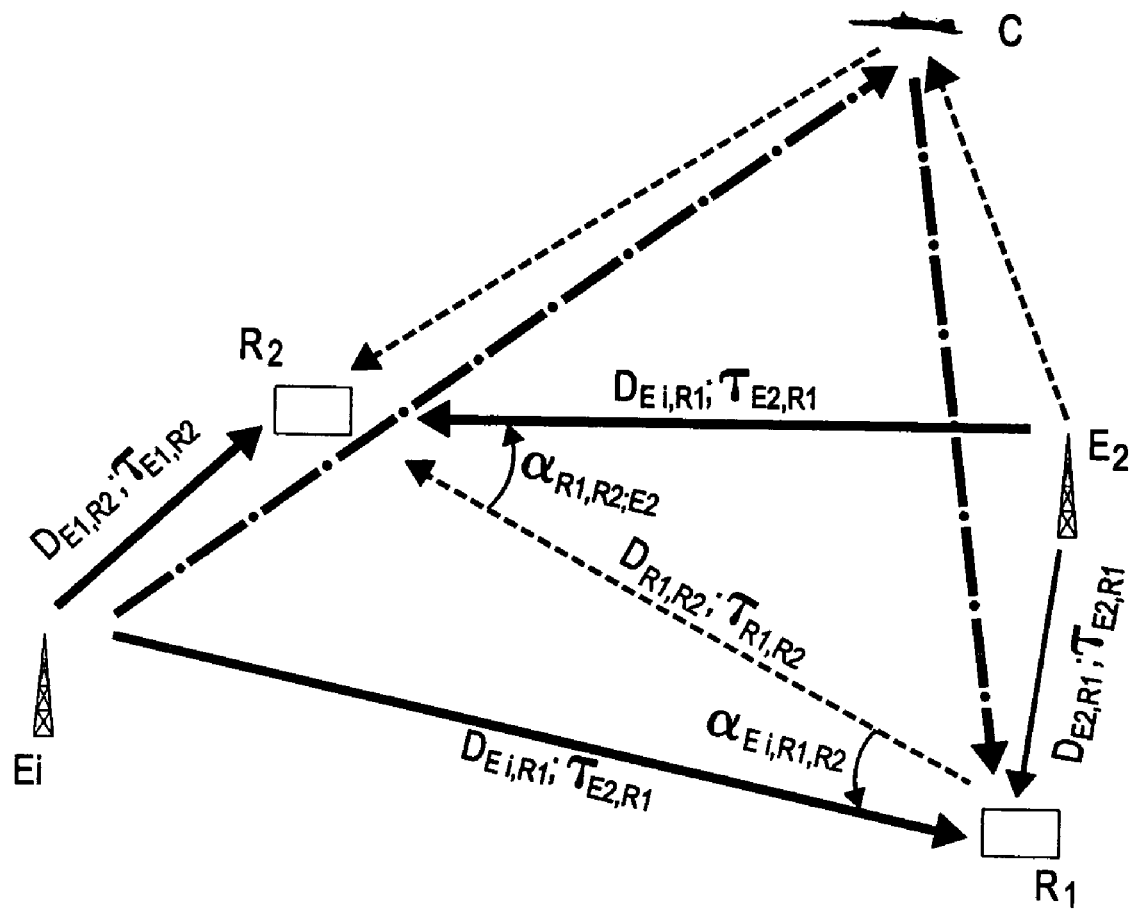

FIG. 3 provides a schematic view of an exemplary configuration of the system according to the invention, by which it is possible to eliminate the need for reception through the direct path coming from the transmitter Ei to the receiver Rj in using only the path reflected from the aircraft. The system has, for example, two transmitters $E_1$, $E_2$ positioned in a network, having known positions and unknown synchronization, and two receivers $R_1$ and $R_2$ having known positions and common synchronization.

The system also knows the respective distances and azimuths of $R_1$, $R_2$, $E_1$, $E_2$. The receiver $R_1$ receives the direct path from the transmitter $E_2$ and the reflected path from the aircraft, coming from $E_1$.

The parameters used for the method according to the invention are:

the propagation time between $E_1$ et $R_2$: $\tau_{E1,R2} = D_{E1,R2}/c$ (known by $R_1$ and $R_2$) Di,j represents the distance between the device i (transmitter or receiver) and the device j.

the propagation time between $R_1$ and $R_2$: $\tau_{R1,R2} = D_{R1,R2}/c$ (known by $R_1$ and $R_2$)

the propagation time between $E_1$ and $R_1$: $\tau_{E1,R1} = D_{E1,R1}/c$ (known by $R_1$ and $R_2$)

the propagation time of the signal reflected by the target on the path E1,C,R1:

$$\tau_{E1,C,R1} = (D_{E1,C} + D_{C,R1})/c \text{(unknown)} \quad (2)$$

the instant of transmission of the reference signal by $E_1$: $T0_1$, unknown to $R_1$ the instant of arrival of the reference signal directly transmitted by $E_1$ to the receiver $R_2$:

$T0_{1,2} = T0_1 + \tau_{E1,R2}$ (measured) => $T0_1 = T0_{1,2} - \tau_{E1,R2}$ (computed)

The instant at which the direct signal from $E_1$ "should reach" $R_1$:

$T0_{1,1} = T0_1 + \tau_{E1,R1} = T0_{1,2} + (\tau_{E1,R1} - \tau_{E1,R2})$ (computed)

the instant of arrival of the signal reflected by the target $T0_{1,C,1} = T0_1 + \tau_{E1,C,R1}$ (measured)

The determining of the propagation time of the path E1,C, R1 of the signal reflected by the target $$\tau_{E1,C,R1} = T0_{1,C,1} - T0_{1,1} \quad (3)$$

The characteristics of the invention make it possible to evaluate the parameters stated here above. Their relationship with the different steps of the method shall appear from the following.

Step h) Hyperbolic Location

The principle of hyperbolic location consists in estimating the bistatic delay between the transmitter Ei and the receiver Rj $$\tau Bij(\tau\beta ij = \tau Ei,C + \tau C,Rj - Ei,Rj) \quad (4)$$

with $\tau$ Ei,C+$\tau$C,Rj–$\tau$ Ei,Rj corresponding to the time between the transmitter Ei and the aircraft C+the time between the aircraft C and the receiver Rj+the period between the transmitter Ei and the receiver Rj.

The temporal resolution of the measurement is R$\tau$. Since the propagation is assumed to be direct-type isovelocity propagation, the locus of the points corresponding to the bistatic time $\tau\beta ij$ relative to the aircraft C is the volume Vij included between two hyperboloids, defined by the following inequalities (on a point M):

$$-c.R_\tau/2 \leq d(M,Ei) + d(M,Rj) - c.\tau Ei,Rj \leq c.R_\tau/2 \quad (5)$$

Multiple measurements of the aircraft C on several transmitter-receiver pairs Eik, Rjk are used to locate the aircraft at the intersection of the volumes Vik,jk defined by the inequality (5).

A bistatic measurement on the pair Ei, Rj adjoining an angular measurement $\Psi$c,j [spherical angle=(relative bearing, elevation angle)] with an angular resolution $R_\psi$ at the receiver Rj gives the position of the aircraft at the intersection of the volume Vij of the cone resulting from Rj, with an axis $\Psi$c,j and an aperture $R_\psi$.

By multiplying the measurements on the pairs (Ei, Rj)i,j, the method offers the possibility of refining the locating and tracking of an aircraft.

Measurements of Delay

To lead to the estimation of the temporal parameters described here above for the hyperbolic location, the method according to the invention implements methods that exploit especially the discriminating sequences used in digital transmission signals for the locking in of the receiver.

The method uses a priori knowledge of the discriminating sequences in standardized or known digital transmissions, to execute the following operations:

1) the building of an estimator of the synchronization instants and Doppler frequencies corresponding to each replica of the discriminating signal,
2) the separation, by spatial and temporal filtering, of the transmitters simultaneously present on the same carrier frequency according to principles known to those skilled in the art. Examples of filtering are given by way of a non-restrictive illustration with reference to FIGS. 4, 5 and 6,
3) the production of the pulse response of the propagation filter, as illustrated for example in FIG. 2, which shows:

the signals coming from the direct path Ei, Rj (in addition to multiple paths if any), when it is received by Rj, at the end of the propagation time $t_{Ei, Rj}$;

the signals coming from the paths reflected by the aircraft, Ei, C, Rj (with few multiple paths or no multiple paths given the ground/air and then the air/ground transmission) at the end of the propagation period $t_{Ei,C,Rj}$.

These different modes of implementation are applied, for example, by means of the system for the reception and digitization of the signals provided for this purpose.

Figures 4A, 4B:
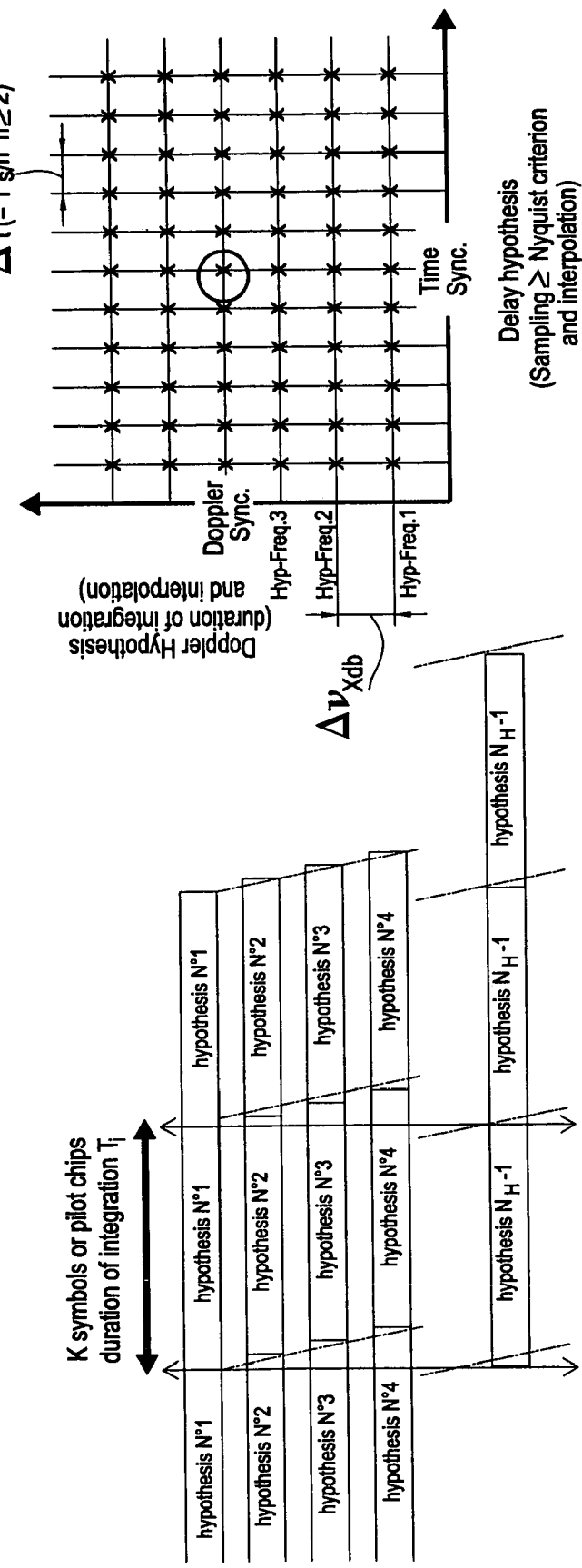

FIG. 4 shows an exemplary implementation of the processing operations proper carried out on sliding windows, indexed on the length of the discriminating sequences, the sampling frequency of the signal, the excursion and meshing of the time/frequency domain. The first part 4a of the figure represents the detection and the time/Doppler synchronization on a time-sliding window and the computation of a window-based criterion C(n). The second part 4b of the figure is a graph, where the x-axis corresponds to the synchronization in time and the y-axis corresponds to the Doppler synchronization, representing the computation C(n) on each window with the coverage of the delay/Doppler excursion domain.

Figure 5:
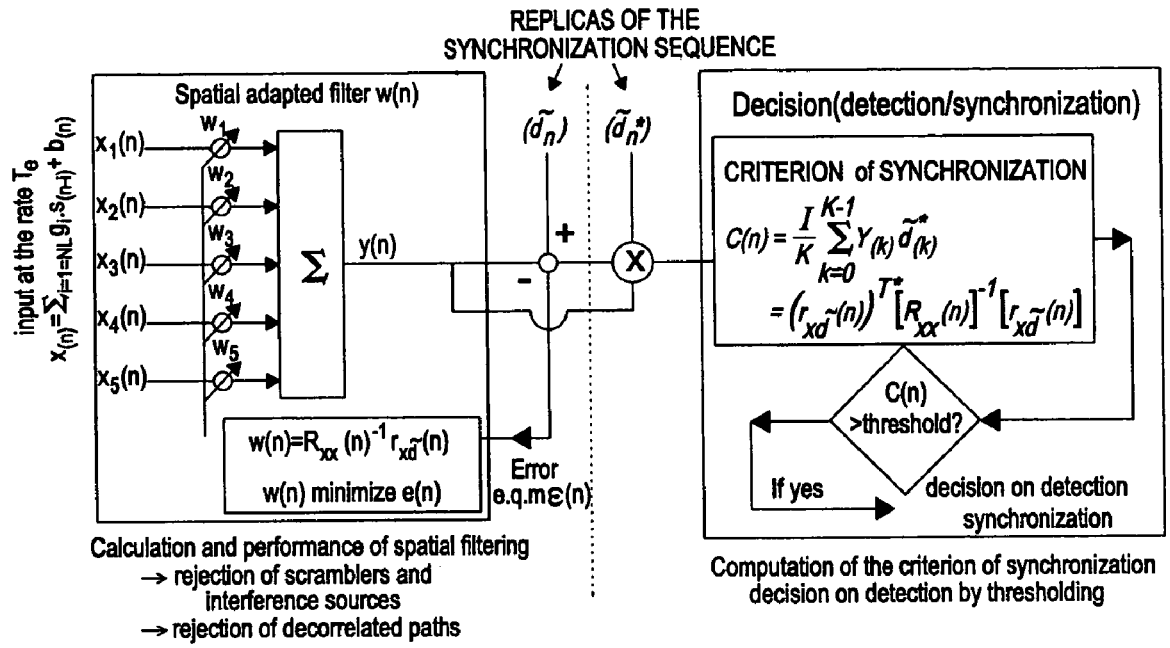
Figure 6:
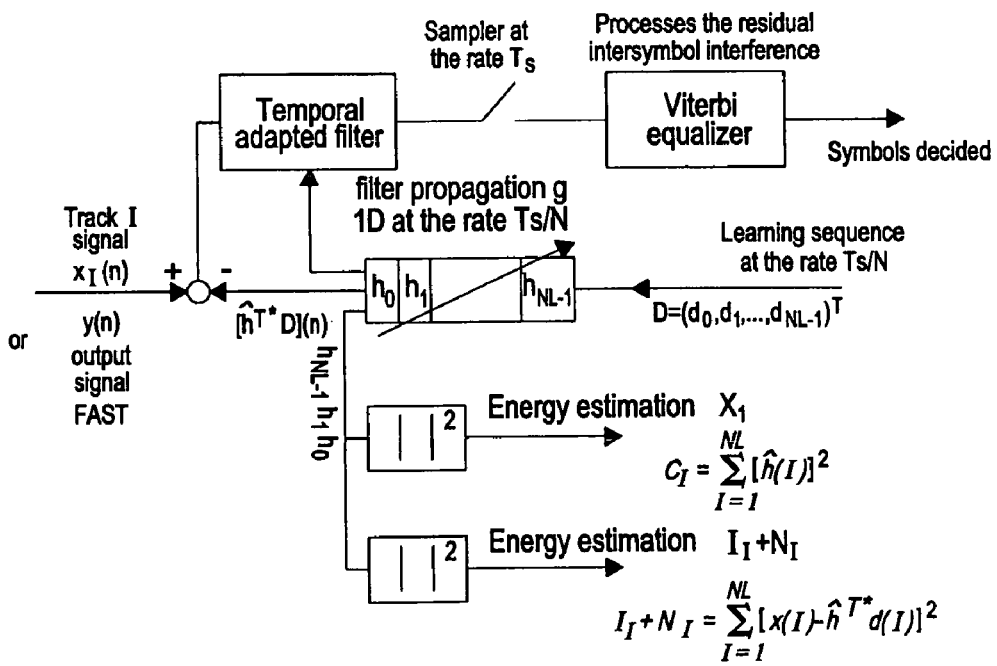

The space-time filtering method used to determine the instants of arrival or delay of the signals from the propagation paths for the purposes of hyperbolic location according to the invention makes use of the principles and algorithms defined by way of non-restrictive examples in FIGS. 5 and 6. Other algorithms of similar types can also be implemented, for example combined detection algorithms, MMSE (Minimum Mean Square Error), MLSE (Maximum Likelihood Sequence Estimator) and other such algorithms can be used.

FIG. 5 gives a schematic view of the structure for the processing of signals received on a network of sensors using a Spatial Adapted Filter (SAF).

FIG. 6 gives a schematic view of an architecture enabling a single-track channel estimation plus the power computation.

These processing operations form the basis of the detection of the signals and of the determination of the temporal variables needed for the hyperbolic location.

Space-Time Processing: Definitions

Variables

Ts: symbol period, The sampling period, writing convention $f_{(n)}=f(nT_e)$

NL: length of the response of the channel in samples

K: length of the discriminating sequence (bits or pilot code, learning sequence, etc.)

s: signal sent in the form $$s(t) = \sum_{n=0}^{q} j^n a_n C_0(t - nT)$$

again with the convention $s_{(n)}=s_{(nTe)}$ $C_0$: Chief modulation function d: learning sequence (size K×1), $d=(d_1, \ldots, d_K)^T$, $d_K$ scalar,
$\tilde{d}$: version of d filtered by the modulation and the reception filter $\tilde{d}=(\tilde{d}_1, \ldots, \tilde{d}_K)^T$ g: response of the multiple-track channel (size 5×NL) $g=(g_0, \ldots, g_{NL-1})$ with $g_i$: 5×1 h: response of the multiple-track channel (size NL×1) $h=(h_0, \ldots, h_{NL-1})^T$ with $h_i$: 1×1 x: multiple-track signal at input filtered by the channel g and noise-infested by the total noise $b_T$ $x_{(n)}=\Sigma_{i=1,NL}g_{(i)} \cdot s_{n-i}+b_{T(n)}$ with $b_{T(n)}$: total noise=vector (noise+interference)

NOTE: at a sampling instant n, $x_{(n)}$, $b_{T(n)}$ are vectors 5×1

S(n): matrices NL×1 built with the NL samples of s: $S_{(n)}=(s_{(n)}, \ldots s_{(n+K-1)})^T$ X(n): matrices 5×K built with the K samples of x: $X_{(n)}=(x_{(n)}, \ldots x_{(n+K-1)})$ D(k): matrices NL×1 built with the NL samples of $\tilde{d}$: $D(k)=(\tilde{d}_{(k)}, \ldots, \tilde{d}_{(k+NL-1)})^T$ Correlation Operators Intercorrelation matrices on K samples averaged on K samples between the input signal x and the sequence $\tilde{d}$, equal to d modulated by the function $C_0$, $$r_{x\tilde{d}}(n) = \frac{1}{K}\sum_{k=0}^{K-1} x_{(n+k)}\tilde{d}_{(k)}^* - \text{size}(5*1)$$

Matrix of self-correlation of the input signal x on K samples, averaged on K samples.

$$R_{xx}(n) = \frac{1}{K}\sum_{k=0}^{K-1} x_{(n+k)}x_{(n+k)}^{T^*} - \text{size}(5*5)$$

Intercorrelation matrix on NL samples of the input signal x and the sequence D, averaged on K samples–Size (5*NL)

$$R_{xD}(n) = \frac{1}{K}\sum_{k=0}^{K-1} x_{(n+k)}D_{(k)}^{T^*}$$

Intercorrelation matrix on NL samples of the input signal x and the sequence D, averaged on K samples–Size (NL*NL)

$$R_{dd} = \frac{1}{K}\sum_{k=0}^{K-1} D_{(k)}D_{(k)}^{T^*}$$

Detection and Multiple-Track Synchronization by Spatially Adapted Filter (SAF)

The principle lies in finding the optimal instant n of synchronization in the sense of the maximum likelihood in temporally white Gaussian noise. The solution lies in the use of a filter w(n) $w(n)=R_{xx}(n)^{-1} \cdot r_{x\tilde{d}}(n)$ (estimated MC of the Wiener filter)

W fulfils the criterion $$\min_{\hat{w}}\left\{\left\|\hat{w}^{T^*} x(k) - \tilde{d}(k)^2\right\|\right\}$$

This filter applied to the signal maximizes the correlation with the sequence at output. The correlation is given at the instant n by C(n).

$$C(n) = (r_{x\tilde{d}}(n))^{T^*} R_{xx}(n)^{-1} \cdot r_{x\tilde{d}}(n) = \frac{1}{K}\sum_{k=1}^{K} y(n+k)\tilde{d}(k)^*$$

One-dimensional case: C(n) is simply the intercorrelation of x and is standardized by $\|x\|\|\tilde{d}\|$ on a window with a length K (<=>optimum receiver in the single-path case).

Channel Estimation Followed by Computation of Power on Discriminating Sequence by Temporal Adapted Filter Channel Estimation and Computation of Power on Discriminating Sequence The principle lies in minimizing the following expression for a value $\hat{h}$ $$\min_{\hat{h}}\left\{\left\|x_1(k) - \hat{h}^{T^*} D(k)^2\right\|\right\}$$

with $x_1$ being the signal on the channel No. 1 and $\hat{h}^{T^*}D(k)$ being the replica of the learning sequence filtered by an estimation $\hat{h}$ of the channel.

The solutions are:

$\hat{h}=(DD^{T^*})^{-1}(D^{T^*}x_1)=Rd^{-1}r_{DX}$ energy of the signal estimated on the learning sequence $$C = \sum_{l=1}^{N} |h(l)^2|$$

energy from noise+interference sources estimated on the learning sequence $$I_I + N = \sum_{l=1}^{N} \left| x(l) - \hat{h}^{T^*} d(l) \right|^2$$

In terms of sensitivity, the performance produced by this type of processing is on the whole the following:
1 Processing gain in direct reception $GT_A$ of the order of $GT_A = 10 \log 10 \ (B_e.\tau_e)$
2 Possible downgrading of the processing gain $GT_B$ in bistatic configuration by some dB by elongation, decoherence and depolarization of the signal exploited in the processing operations during the reflection on the target C
3 Sensitivity in reception $\eta_{dB}$ before the noise for a detection margin M dB of the order of:

$$\eta_{dB} = -174{,}6 + M_{dB} + 10 \ \log_{10}(B) - GT_B(dBm)$$

4 Efficient rejection of interference sources on a multiple-track reception architecture whose exact performance values depend on:
  4.1—the number of reception tracks and the quality of their synchronism
  4.2—the number of signals simultaneously received in the duration and the processing band
  4.3—the self-correlation function of the synchronization function used
  4.4—the matrix of intercorrelation between different sequences of synchronization (if there are several of them)
  4.5 post-processing operations for the rejection of false alarms implemented (post-processing operations made necessary both by the defects of the self-correlation matrix of each discriminating sequence and possible inter-correlation operations between sequences if there are several of them).

On the whole, it may be considered from a practical point of view that the performance of the interference sources in terms of rejection attains a value of $-7 + GT_B$ and more, provided that the number of reception tracks is greater than the number of sources present.

When the number of reception tracks is greater than the number of sources present, the measurements of detection and determining of the pulse response of the propagation channel may be conducted on a signal S of the receiver input if it is received with a noise level $N_B$ and a scrambling or interference level I such that:

$$S_{payload\_input}/(N_B+1) > -7 + GT_B(dB)$$

Processing of the Blind Zones

When the direct signal is received, the "simultaneous" reception in the same distance resolution gate of the target-reflected signal induces a blind zone defined by:

$$0 \leq d(M,Ei) + d(M,Rj) \leq +c.\tau_a; \ \kappa > 0$$

The "blind duration" $\tau_a$ considered in the definition of the blind zone may be different from the resolution of the temporal processing of the signals.

It depends in all strictness on the discriminating signal used, the performance of the scrambler and interference rejection processing operations as well as the relative levels of the direct signal when it is received and of the target-reflected signal.

In practice, $\tau_a$ varies between two extreme values which are:
1—Favorable case $\tau_a = R_\tau/2$, half of the resolution of the synchronization processing operation This case occurs when the direct signal is weak enough to be effectively rejected in the synchronization processing operation if the difference between the instants of arrival is greater than $R_\tau/2$.

2—Unfavorable case $\tau_a = T_e$, duration of signal sent.

This case occurs when the direct signal is too strong and saturates the synchronization processing operation.

If the signal is continuous, this means that no measurement can be made without limiting the received level of the direct signal by a method external to the processing:

antenna directivity, distancing of the reception system, or any other method favoring the link balance on the signal reflected from the target.

In any case, this blind zone is an ellipsoid with a focus Ei and Rj defined by $\tau_a$.

Given the mode of propagation losses in the ground/ground configuration, a sufficient distancing of the receivers and transmitters gives a favorable configuration 1 for the implementation of the invention.

Processing of the Ambiguity Zones

To process the ambiguity zones coming from the repetition of the identical discriminating sequences with the period TR and defined by $$-c.R_\tau/2 \leq d(M,Ei) + d(M,Rj) - c.(\tau Ei,Rj + k.T_R) \leq + c.R_\tau/2; \ k \ integer > 0$$

the method consists in carrying out numerous measurements of the aircraft on several pairs Ei, Rj or a trajectography of the aircraft in several detection operations.

These ambiguity zones are ellipsoid crowns with a focus Ei and Rj, with a thickness $R_\tau$.

In practice, in the examples mentioned here below for the implementation of the invention, the ambiguity distances are approximately equivalent to the range of the system or are greater than the range of the system.

Furthermore, in extreme cases, numerous measurements of the target C on several pairs Ei, Rj or a trajectography of the target in several detection operations resolves the ambiguities: these relate to post-processing following the implementation of the invention over a significant duration and/or with several operations of detection and locating of the target.

The method according to the invention can be applied to different types of transmitters and for different types of processing, some of which shall be described as examples of non-exhaustive applications of the method according to the invention.

Table I represent a synthesis of data relating to transmitters of opportunity that can be used to execute the method according to the invention.

| Class | Band (MHz) | Equivalent radiated power kW | Aperture Relative bearing | Aperture Elevation angle | Bandwidth | Transmitter identification |
|---|---|---|---|---|---|---|
| DVB-T Polarization H transmitters | 470–860 | 5–100 | 360° | 10° | 8 MHz, 7 MHz 6 MHz | Decoding in the TPS subcarriers |
| BTS GSM | 900, 1800, 1900, future 400 | 20–1 | 360° or 180° or 120° | 5 to 20° | N*200 kHz N varies between 1 and 32 | CI, BSIC and LAI decoding in BCCH channels on beacon track |

BSIC = Base Station Identity Code
CI = Cell identity
LAI = Location Area Code
BCCH = BroadCast Channel Characteristics of the GSM Signals (According to the ETSI GSM 04:08 Standard)

Figure 7:
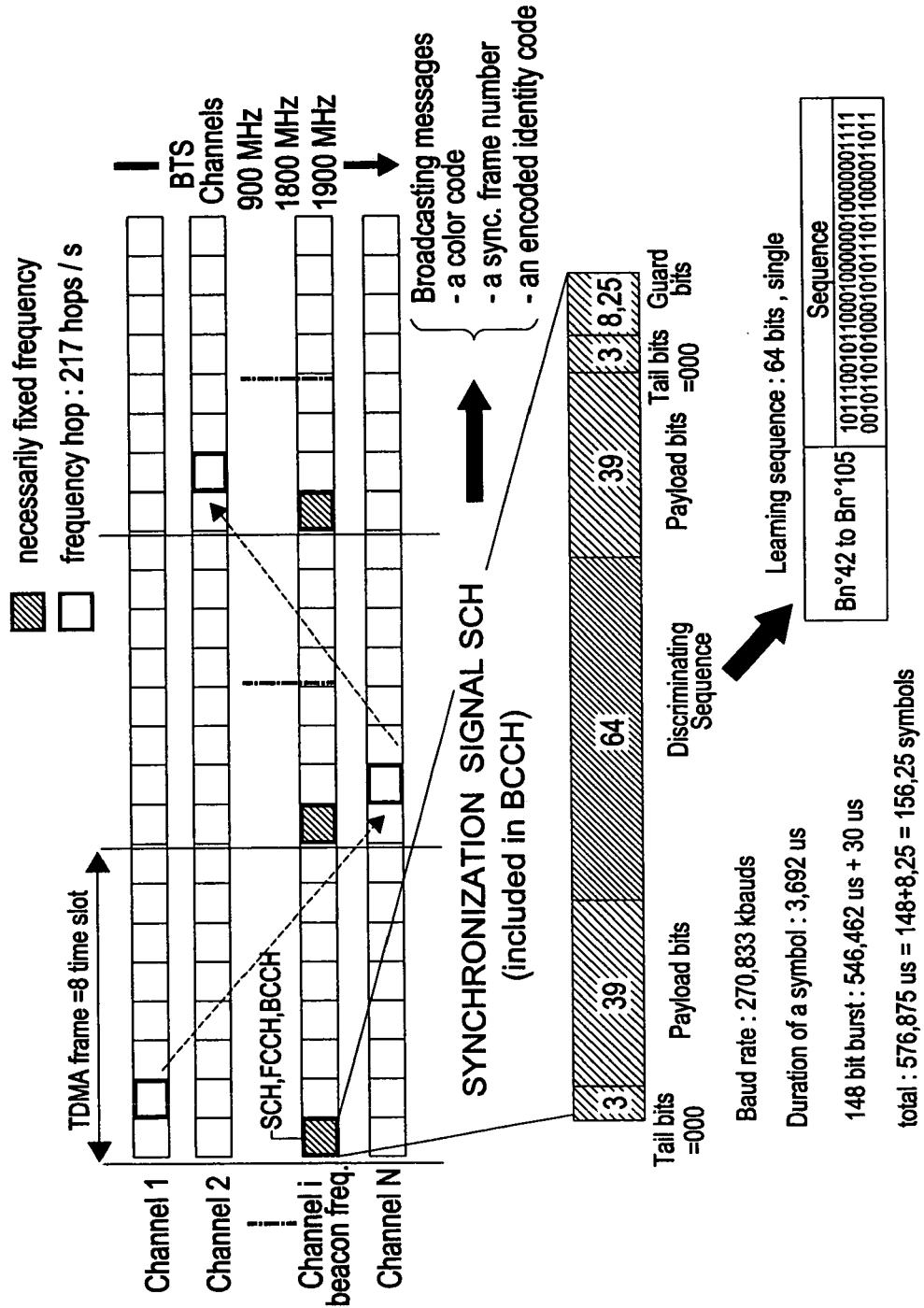
FIG. 7 shows the characteristics of GSM signals.

The main characteristics used in the signals mentioned are represented in FIG. 7.

The synchronization signal SCH included in the BCCH channel comprises the broadcasting messages, a color code BSIC and an identity code CI used especially to identify the transmitter by a synchronization number. The discriminating sequence is unique and encoded on 64 bits.

Characteristics of DVB-T Signals

Figure 8:
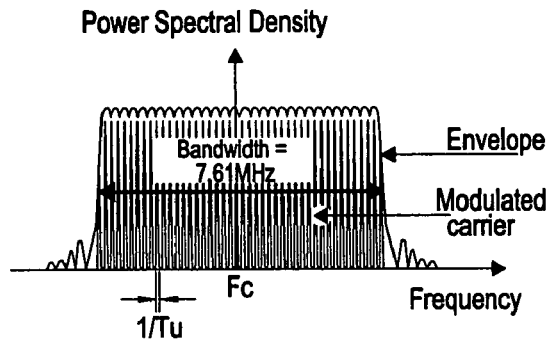
FIG. 8 shows the characteristics of DVB-T transmitters.
Figure 8:
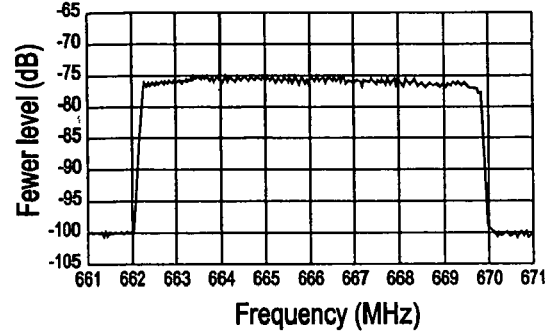
Figure 8:
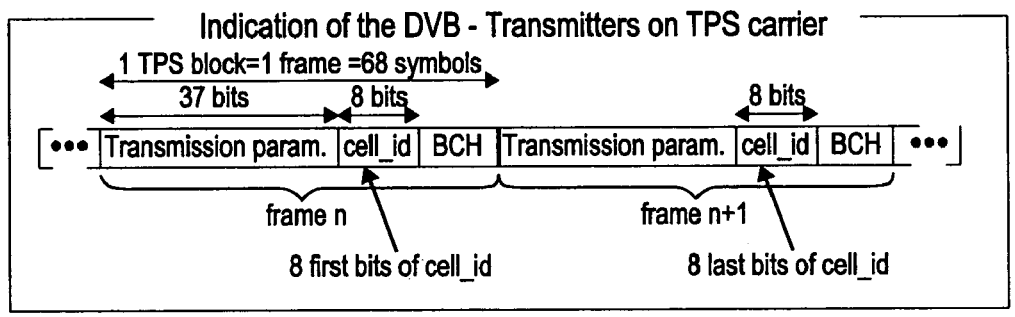
Figure 8:
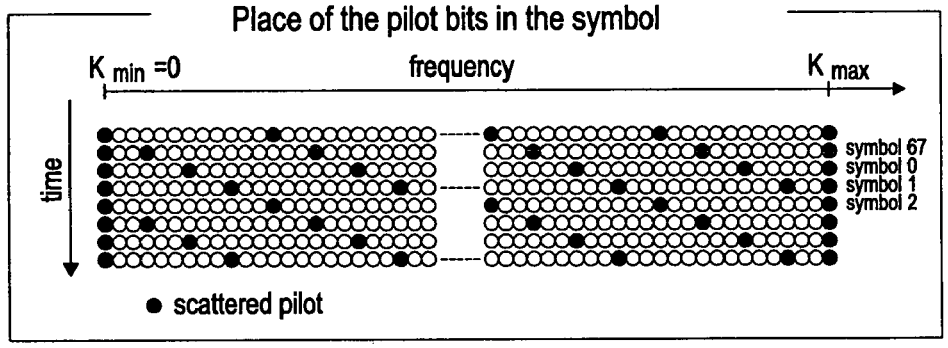

FIG. 8 shows the characteristics of the DVB-T signals used in the method according to the invention.

The identification of the DVB-T transmitters is done by the decoding of the TPS subcarriers. Eight bits of the Cell-id tag are for example used to identify a transmitter.

Numerically Estimated Examples of Implementation of the Method According to the Invention for DVB-T andGSM structures For DVB-T transmitters in 8K mode (8192 subcarriers), the "best" discriminating sequence candidate is the scattered pilot signal present in each symbol (with a duration of about one millisecond), and identical every four symbols (cf. FIG. 8).

Assuming that this signal is not amplified or is attenuated in the signal transmitted, the discriminating sequence occupies 568 subcarriers on a symbol at a rate of one in twelve subcarriers, leading to the following characteristic parameters:

an equivalent band of the order of 8 MHz
a "direct" processing gain $GT_A=10 \log10(568)=27.5$ dB
a ratio $S_{payload\_input}/I$ on a symbol $=-10.\log_{10}(12)=-11$ dB
a recurrence of appearance of a given sequence of 568 scattered pilots every four 4 milliseconds
=>ambiguity distance=120 km, of the order of the expected range of the system
=>little ambiguity distance For GSM infrastructures, the "best" discriminating sequence candidate is the synchronization signal SCH present on the beacon track of each base station (FIG. 7).

Assuming that this signal is neither amplified nor attenuated in the transmitted signal, the discriminating sequence occupies 64 symbols in a burst of 577 microseconds at the rate of about 20 identical sequences per second, giving the following characteristic parameters:

an equivalent band of the order of 270 kHz
a "direct" processing gain $GT_A=10 \log10(64)=18$ dB
a recurrence of appearance approximately every 50 milliseconds,
=>ambiguity distance=about 15,000 km, far greater than the expected range of the system
=>no ambiguity distance.

Given the processing gains corresponding to the signals referred to further above and the possibilities of rejection of false alarms related to the a priori knowledge of the sequences used, it shall be assumed here below, in a simplified way, that the detection and the measurements are possible when the excess of the signal-to-noise+interference ratio at the output of the processing is positive allowing for a margin M taken at the value of 7 dB.

Digital Application

To illustrate the performance of the method according to the invention, the following example considers the nominal cases of exploitation of the GSM base station and of the DVBT transmitters with:

targets having an equivalent surface area SER (reflection surface area) varying from 10 m² (small aircraft) to 100 m² (airliners) in the 400 MHz to 1 GHz band,
equivalent power radiated by the transmitters in the range of 20 W to 10 kW—(known as PeGe),
frequency bands of 500 kHz (DVB-T) and 900 MHz (GSM),
reception bandwidths of 300 kHz (GSM) and 8 MHz (DVB-T mode K on BW 8 MHz)—(called BW),
discriminating sequences exploited as references in the transmitted signal whose product $Be.\tau_e$ varies between:
64 (synchronization sequence SCH of the GSM signaling tracks),
and 512 (scattered pilot of a DVBT signal),
reception by matched dipole type antennas (gain of the antenna in reception $G_{AR}=2$ dBi),
a downgrading of the bistatic processing gain by 3 dB,
ground/air and air/ground propagation losses of a geometrical type in $1/R^2$, R being the distance of the path traveled by the signal, ranging from some kilometers to several tens of kilometers as the case may be.
A margin M equal to 7 dB for computing the excess signal-to-noise ratio.

The reception characteristics taken into account are summarized in two tables below:

| Value in dB | Freq. | PeGe | BW | Nb = FkTB Hyp. F = 10 dB | $G_{AR}$ | SER | $GT_B$ given the bistatic degradation |
|---|---|---|---|---|---|---|---|
| InfraDVBT Mode 8K | 500 MHz | 1–100 kW that is 60 to 80 dBm | 8 MHz that is 69 dB/Hz | −95 dBm | 2 dBi | 0.03 m²– 13.5 dB/m² | 512 that is 27 dB => 24 dB |
| Infra GSM | 900 MHz | 20 W–1 kW, that is 43 to 60 dBm | 270 kHz that is 43 dB/Hz | −109 dBm | 2 dBi | 0.01 m²– 18.5 dB/m² | 64 that is 18 dB => 15 dB |

Under these conditions, the following table gives (non-exhaustive) examples of range that can be attained with a margin of computation M=7 dB taken for the computation of the excess signal-to-noise ratio.

| | | Example of range on | | | | |
|---|---|---|---|---|---|---|
| | PeGe | Small aircraft SER = 10 m² $D_{Ei,C}$ = $D_{Rj,C}$ = | Large aircraft SER = 100 m² $D_{Ei,C}$ = $D_{Rj,C}$ = | $S_{payload\_input,i}$ | $S_{payload\_input,i}$ | Margin M = 7 dB $Excess_{S/B}$ in dB |
| InfraDVBT | 1 kW that is 60 dBm | 25 km 25 km | 44.5 km 44.5 km | −111.3 dB | −87.2 dB | 0 dB |
| InfraDVBT | 100 kW that is 80 dBm | 80 km 80 km | 142.3 km 142.3 km | −111.5 dB | −87.4 dB | 0 dB |
| Infra GSM Urban area | 20 W that is 43 dBm | 9.5 km 9.5 km | 16.9 km 16.9 km | −116.6 | −101.6 | 1 dB |
| Infra GSM Rural area | 300 W that is 55 dBm | 19 km 19 km | 33.8 km 33.8 km | −116.6 | −101.6 | 1 dB |

What is claimed is:

1. A method of detecting a mobile craft in a reception system making use of transmitters of opportunity whose signal comprises elements enabling the synchronization of the receiver, wherein the method comprises the following steps:

a) detecting certain discriminating sequences of a signal,
b) separating each transmission present on the carrier frequencies examined by the receiver by the space/time filtering of the signals in each carrier frequency,
c) identifying the transmitters Ei corresponding to the signals received,
d) determining the pulse response of the propagation channel for each transmitter Ei and for each detection made on the transmitter Ei,
g) measuring the instant of arrival of the signal reflected on the path by the mobile craft and then its delay relative to the instant of transmission from the transmitter,
h) deducing the position of the mobile craft at the intersection of the ellipsoids defined by the foci constituted by the transmitters Ei from which signals are received and the receiver or receivers Rj.

2. The method according to claim 1, comprising the following steps:

e) separating, in the pulse response, of the contribution of the signal or the direct transmitter-receiver path from the contribution of the path reflected by the mobile craft;

f) measuring of the instant of arrival of the direct path signal and then its delay relative to the instant of transmission from the transmitter;

g) measuring of the instant of arrival of the signal or the path reflected by the mobile craft and then its delay relative to the direct signal from the transmitter.

3. The method according to claim 1, comprising the following steps:

i) measuring the angles of arrival of the signal reflected by the mobile craft at the receivers Rj, j) deducing the position of the mobile craft at the intersection of the previously defined ellipsoids and the straight line defined by the angles of arrival and the position of the receiver Rj.

4. The method according to claim 2, comprising the following steps:

i) measuring the angles of arrival of the signal reflected by the mobile craft at the receivers Rj, j) deducing the position of the mobile craft at the intersection of the previously defined ellipsoids and the straight line defined by the angles of arrival and the position of the receiver Rj.

* * * * *